Nov. 3, 1931.   A. DINA   1,830,158
FILM TRAP AND FILM TRAP DOOR
Filed Sept. 5, 1925   7 Sheets-Sheet 1

Fig.1

INVENTOR
Augusto Dina
BY
ATTORNEY

Nov. 3, 1931.  A. DINA  1,830,158
FILM TRAP AND FILM TRAP DOOR
Filed Sept. 5, 1925   7 Sheets-Sheet 3

INVENTOR
Augusto Dina
BY
ATTORNEY

Nov. 3, 1931.    A. DINA    1,830,158
FILM TRAP AND FILM TRAP DOOR
Filed Sept. 5, 1925    7 Sheets-Sheet 5

INVENTOR
Augusto Dina
BY
ATTORNEY

Nov. 3, 1931.  A. DINA  1,830,158

FILM TRAP AND FILM TRAP DOOR

Filed Sept. 5, 1925  7 Sheets-Sheet 7

INVENTOR
Augusto Dina
BY
ATTORNEY

Patented Nov. 3, 1931

1,830,158

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

FILM TRAP AND FILM TRAPDOOR

Application filed September 5, 1925. Serial No. 54,619.

My invention relates to motion picture projectors and has reference more particularly to an improved construction of projector provided with an improved film trap and film trap door, whereby a more efficient operation of the projector may be obtained, as well as certain other advantages, which will be apparent to those skilled in the art.

The present invention is characterized by various improvements in the motion picture projector whereby a more efficient and reliable operation is obtained, the basic features of such improvements or modifications being broadly an improved construction of the film trap, film trap door and associated parts, the film trap door having a novel form of support on the film trap whereby it may be readily inserted or removed. Means are provided for rigidly sustaining the film trap door along its entire breadth, and centrally at each end of the film gate aperture, while an improved construction is employed for the film trap door itself, and conveniently includes as a part thereof a main casting and a front plate, having provided therewith pressure elements serving as a substantially coextensive resilient engaging surface for the door, this provision lending itself nicely to the requirements of the mechanism, while, on the other hand, certain novel features are employed in the mounting of the film trap door holder upon supporting elements carried by the film trap.

The principal objects and advantages which characterize this invention will thus be seen to reside in the provision of an improved motion picture projector mechanism characterized by the association therewith of an improved film trap and film trap door; the provision of an improved motion picture projector including an improved form of fire shutter; an improved intermittent sprocket pad; the provision of an improved film trap door locking and releasing mechanism; locking and releasing mechanism; the provision of an improved support and guide for the film trap door and its associated parts; the provision of an improved anti-friction bearing for the film feeding and guiding rollers; the provision of an improved supporting bearing for the feeding rollers which is adapted for adjustment to permit a roller to accommodate itself to irregularities in the film when passing through the machine; and provision of such other improvements, arrangements of parts and their functions and relationship as may hereinafter be pointed out.

Still further objects of my invention reside in the provision of improved type of heat shields which extend a maximum distance from the film gate in the film trap; thereby permitting a more compact association of the locking and releasing mechanism of the film door with respect to the door itself, so that the release may be more conveniently accessible to the operator at a time when practically all his attention is devoted to the threading of the film in the machine. Both hands of the operator are usually necessary in this operation to hold the film in the threaded position, with the loops above and below the gate and the hands ready to close the film trap door with whatever fingers that might be free. Consequently, those skilled in the art are acquainted with the difficulty experienced in finding the trip lever, which was heretofore hidden under the lens holder and will fully appreciate the advantage of an arrangement permitting a transverse release readily accessible at the film threading side, which does not require the hands to shift their positions while holding the film in threaded position in order to actuate this release. Still further, the safety of the film is proportionately increased by the maximum spacing of the heat shield and the menace heretofore experienced of conflagration of the film is accordingly lessened.

Other objects and advantages will be apparent from the following description when read in connection with the accompanying drawings, in which.

Figure 1:
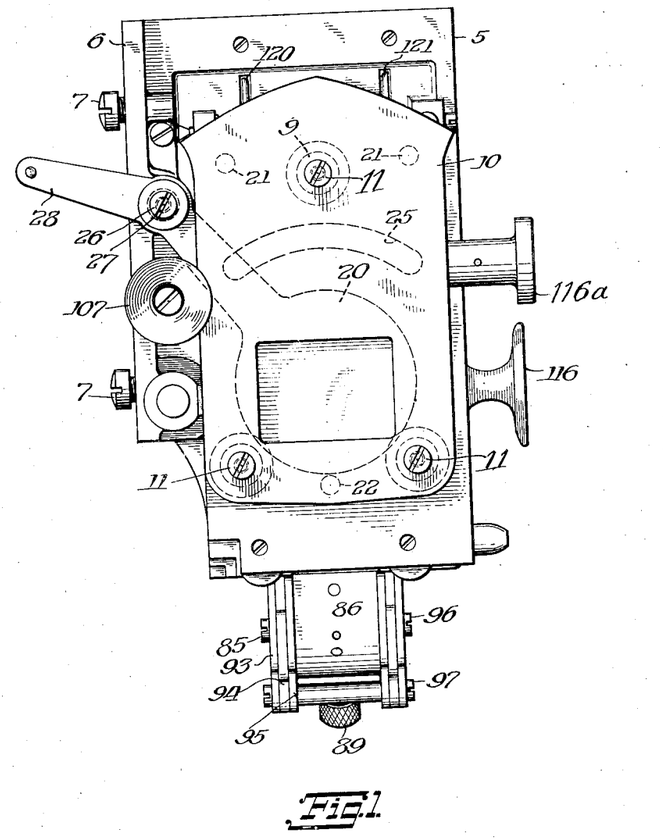
Fig. 1 is a front elevation of the film trap, looking in the direction of the heat shields.

Referring to the drawings, the film trap indicated at 5 may be of a suitable casting which will serve as a carrier for the mechanism to be hereinafter described. It is provided with a side flange 6, at its inner edge, affording means for attaching it to the frame of the motion picture projector. The manner in which it is attached is of little consequence to this invention, except in so far as it permits the mechanism disclosed herein to be interchangeably connected as a unit to the frame, so that it can be readily adopted universally in lieu of the construction now employed on machines in use. As illustrated in Fig. 1, a plurality of fastening bolts 7 enter flange 6, while guide pins (not shown) may extend into the openings 8 adjacent to the bolts 7 in this flange 1 (see Fig. 10).

It will be observed that forwardly extending bosses 9 are formed on film trap 5, these bosses being arranged to form a three point mounting for the heat shields 10. The outer ends of these bosses are tapped to receive screws 11 passing through the heat shields and holding the first or outer shield 14 slightly extended from the second and third shields 15 and 16, which are arranged together, in a somewhat opposed relation. The first shield 14 may be made of asbestos, if so desired, but from the manufacturing or practical standpoint I find that a high grade of metal, such as steel, will suffice. By referring particularly to Fig. 1, it will be seen that these three screws 11 are arranged so that two of them secure the heat shields 10 at their bottom, and the third screw provides a single fastening near the upper end of the shields.

It will be further observed that the second and third shields are paired and suitably spaced to provide for the reception of an automatically operated fire shutter 20, which is adapted to have a limited movement therebetween. This movement is defined by stops designated 21 and 22, the stops 21 serving to limit the upwarward movement of fire shutter 20 when in open position, and the single stop 22 serving to limit the downward movement of the fire shutter to closed position. This position is usually obtained by fire shutter 20 when a break in the film occurs, or when the machine stops operating. The mechanism for accomplishing the closing movement of fire shutter 20 forms no part of my present invention. Stops 21 and 22 may comprise opposed beads formed in the shields 15 and 16 during the stamping operation. Also formed in these shields during the stamping operation are inwardly extending or raised arcuate portions 25 serving to guide fire shutter 20 in its swinging movement between the shields. It will be noted in Figs. 1 and 10 that this fire shutter 20 is pivotally mounted at the end of a door holder guide rod (which will be hereinafter fully described) by means of a screw 26 and a washer 27, the outer end of the shutter arm 28 projecting a suitable distance so as to connect with mechanism (not shown) for operating the same. The rod projects a distance from the mounting flange 6 in an integral bearing boss 29 illustrated in Fig. 10.

Figure 4:
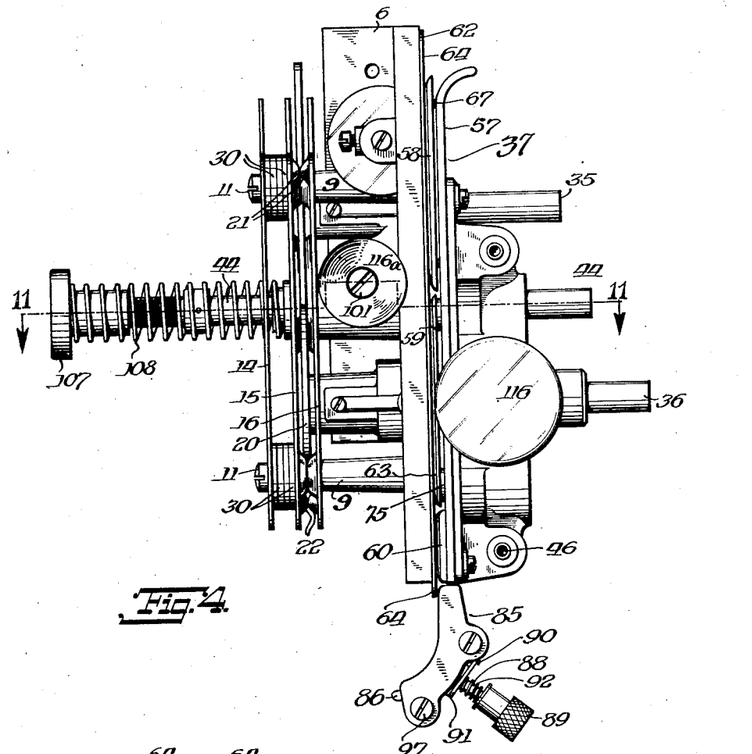
Fig. 4 is a view looking toward the side of the device where the film is threaded in the machine.
Figure 6:
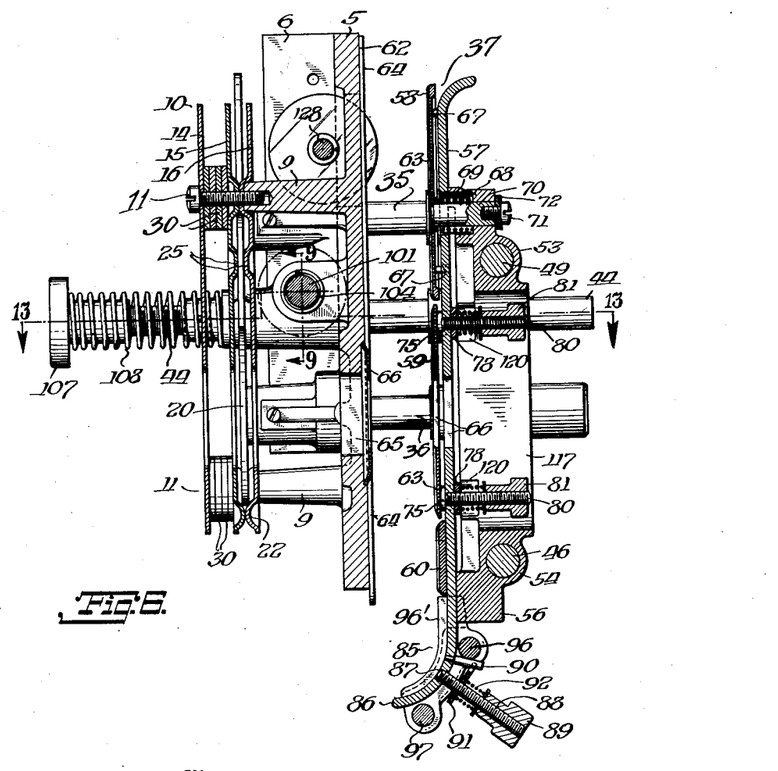
Fig. 6 is a transverse section through the center of the mechanism shown herein, the view being taken along line 6—6 of Fig. 2 and looking in the direction of the arrows.

It will be seen in Figs. 4 and 6 that the heat shield 14 is spaced a considerable distance from the other heat shields by means of a plurality of spacing collars 30 carried by the screws 11, the entire arrangement of these shields being unique, in that they give ample protection against conflagration of the film, often due to the intense heat developed in the lamp house of the machine. It will be here noted that the fire shutter is spaced a maximum distance from the film, in practice amounting to almost one and one-fourth inches.

I shall now describe the film trap door and its mounting.

Extending transversely to the plane of the film trap 5 are a plurality of guide rods 35 and 36 serving to support and guide the film trap door 37 in its movement to open and closed positions. Mounted upon these rods is a film trap door holder 38 preferably made of aluminum to reduce the shock when the film trap door is closed. Rods 35 and 36 extend along flange 6 and into the plate 5 in fixed relation, preferably projecting, however, beyond this flange on the opposite side in bearing bosses 29 and 39. As before mentioned the upper rod 35 has the arm 28 of fire shuter 20 pivoted thereto by means of screw 26.

Figure 10:
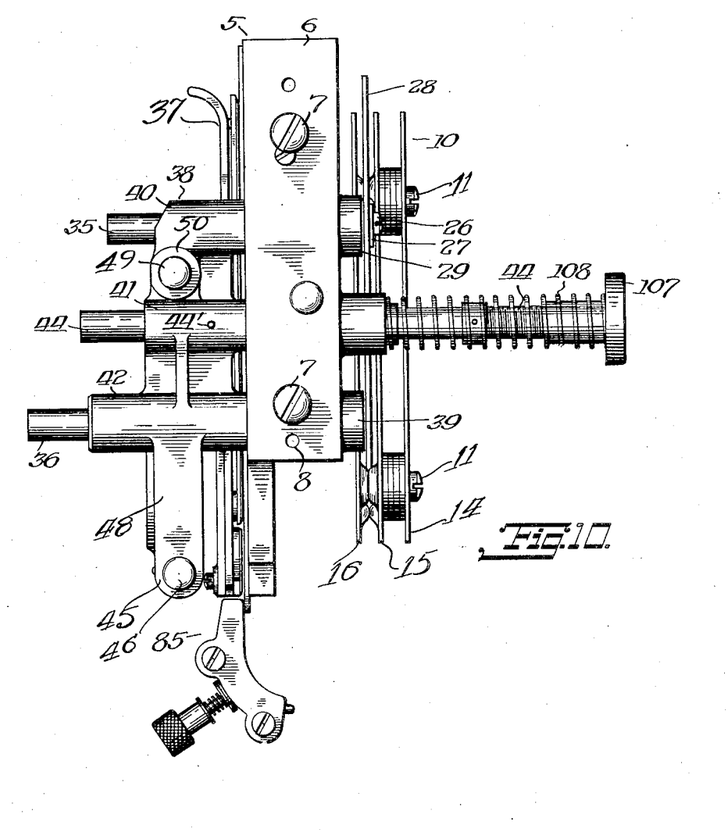
Fig. 10 is a view of the side of the film trap which is opposite to the side shown in Fig. 4.

Film trap door holder 38 is preferably of uniform design, so that it can be made with the greatest precision. It is well sustained by the film trap, through rods 35 and 36, and as will be presently described, it supports the door in the most rational way. When the film trap door is released, holder 38 closes against the film trap along one edge and the impact is borne by three points, these being immediately in front of the bearings formed at bosses 40, 41 and 42, which are formed on the holder to serve as bearings therefor along the rods, and also along a rod 44 forming part of the door locking and releasing mechanism to be later described. Bosses 40 and 41 have been curtailed slightly, as illustrated in Fig. 10, to provide for clearance for other parts of the machine, which are not shown in the drawings. Holder 38 may be fixed to rod 44 by means of a pin 44' and moved to open and closed positions thereby. The rod 44 extends through the film trap 5 and projects a considerable distance on the opposite side.

Holder 38 has a downwardly extending projection 48 of webbed formation, provided with a boss 45 serving to receive a lower transverse mounting rod 46, which is fixed therein by means of a pin 47. An upper rod 49, serving the same function, is likewise received in a boss 50 at the upper end of this holder 38, rod 49 being also fixed in position by a pin 51. In this instance, boss 50 is slightly longer than boss 45 to provide an extended bearing for rod 49.

Film trap door 37 is supported by holder 38. Rods 46 and 49 serve to receive the film trap door whereby this door may be inserted upon and withdrawn from holder 38. It is of importance to the present invention that the door be supported in interchangeable relation, as certain practical advantages are obtained, which cannot be otherwise realized if supported by a permanent mounting. I wish to stress the manner in which this is accomplished. By providing film trap door 37 with corresponding apertured bearing portions 53 and 54 into which rods 46 and 49 slide, the door may be quickly and easily inserted or renewed. Film trap door 37 is provided in two portions, a main casting 56 and a front plate 57.

The main casting 56 is provided with the apertured bearing portions 53 and 54 and is preferably of aluminum, the same as the front plate 57, in order to reduce shock when the door is released and closed.

It will be later observed that when the releasing mechanism is actuated, door 37 is brought to closed position against the film trap 5 with a quick action. I have provided pressure elements 58, 59 and 60 tending to absorb the impact, and these pressure elements are embodied in the front plate 57 in the form of pressure pads, which form a substantially coextensive resilient engaging surface for the face of film trap door 37. This face is smooth and confines the film between the same and the opposed face of the film trap when traveling through the motion picture projector and past the film gate 65.

A correspondingly smooth planar face 62 is furnished on film trap 5. Steel ribbon inserts may be provided which project slightly and furnish the engaging portions of these faces. In the pads 58, 59 and 60 the ribbon inserts 63 are slightly narrower than the ribbons 64 on the face 62 of film trap 5.

I prefer inserting the ribbons 63 a short distance in the pads while the ribbons 64 of the film trap may be attached against or upon the face 62.

A film gate aperture 65 is suitably furnished in the film trap 5 in alignment with the corresponding apertures in the heat shields 10, above described. Spring pad 59 and the front plate 57 of the film trap door 37 may likewise have similar apertures 66 in alignment with the film gate aperture 65.

It is well known to those skilled in the art that it is preferable to have the film slightly under tension when passing the film gate 65. That is to say, the film should be tightly held across the face of this film gate opening and to this end I provide a slightly extended face member 66 seated in front of the film gate aperture, so that its outer surface will be flush with the ribbons 64.

The upper spring pad 58 is guided in its resilient movement against the face of the front plate 57 of film trap door 37 by a plurality of short pins 67 extending into this front plate in openings of slightly larger diameter. In order that the resilient movement of pad 58 will be uniform throughout, these pins 67 may be disposed at the four corners of pad 58. The resiliency is imparted to pad 58 by means of a compression spring 69 confined in an apertured lug 68 carried behind the front plate on the main casting 56 of door 37. Spring 69 surrounds a pin 70 fixed to pad 63 and extending centrally through the apertured lug 68 for receiving a screw 71 at its outer end. A collar 72 is carried by the screw 71 for limiting the movement of spring pad 58 away from the front plate 57.

Figure 7:
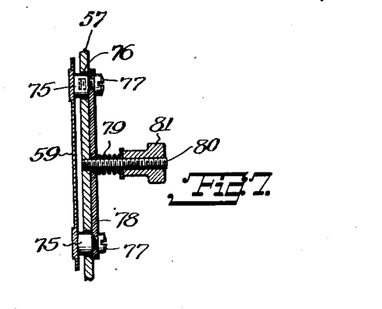
Fig. 7 is a detail sectional view taken on line 7—7 of Fig. 8.

The central spring pad 59 may be provided with a slightly different spring arrangement, and in this instance the tension of the springs may be adjusted to secure the proper uniform pressure of pad 59 against film trap 5, when the film trap door 37 is in closed position. By referring to Fig. 7, it will be seen that this construction comprises a plurality of short studs 75, extending from the four corners of pad 59 through openings 76 in the front plate 57. The studs are tapped to receive screws 77 for fastening upper and lower cross bars 78 thereto. The tension of springs 79 is applied, through these cross bars 78, by means of a pair of bolts 80 threaded into the front plate 57 and extending rearwardly with adjusting nuts 81 at their outer ends. Springs 79 are confined between cross bars 78 and these adjusting nuts, so that the pressure of these springs may be varied by movement of the nuts along bolts 80. The pressure of springs 79 is applied against cross bars 78, and is transmitted to pad 59 through studs 75. By providing two adjusting bolts, one at the lower end of pad 59 and one at the upper end of this pad, it is possible to vary the tension uniformly throughout the pad.

I consider the construction of spring pads 58 and 59 of considerable value, and shall therefore claim the same broadly.

The lower pad 60 is preferably secured directly to the front plate 57 of door 37, but if it is desired, this pad may be of a construction similar to the upper and central pads. All of the pads may be made of aluminum so as to assist in reducing the shock when the door is moved to closed position. Pad 60 further serves, however, as a lower stationary guide for the film as it is about to be gripped by the lower intermittent sprocket, which will be presently described.

Figure 8:
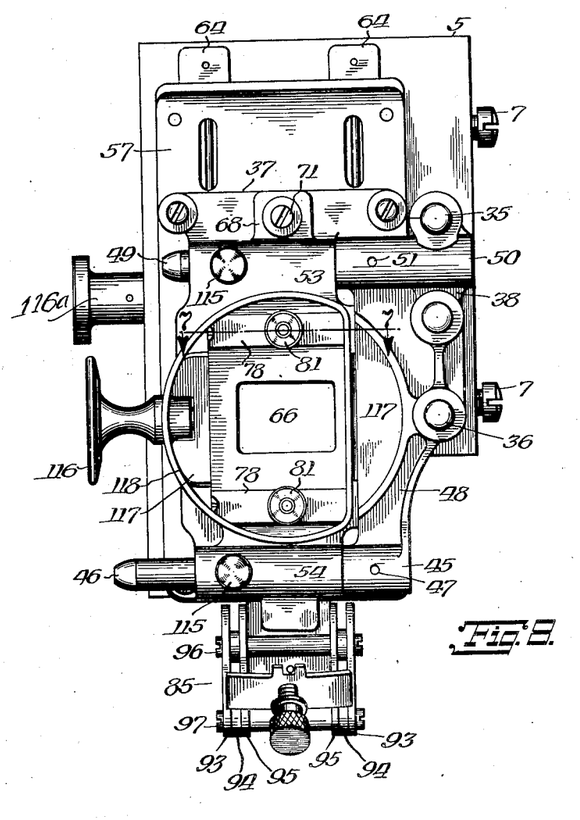
Fig. 8 is a rear view of this mechanism, showing the mounting for the film trap door.

As before mentioned, the main casting 56 of the film trap door 37 is provided with the apertured bearing portions 53 and 54 to slidably receive therein the rods 46 and 49 carried by the door holder 38. Door 37 may be quickly slipped in place in the machine and held upon these rods by locking screws 115. I provide a door knob 116 on the door so as to permit the latter to be easily gripped for removal or insertion. By referring particularly to Figs. 6 and 8, the unique design or formation of main casting 56 will be clearly seen. The central portion thereof is provided with a somewhat enlarged cylindrical opening 117, which furnishes an annular flange 118. The inner end of the cylindrical housing of the lens holder (not shown) is permitted neatly to fit within the opening 117 against the interior surface of flange 118. An upper and lower pocket 120 may be formed on the inside edge of main casting 56 adjacent to the cylindrical opening 117 for the reception of the ends of bars 78 in their movement permitting the resilient action of central spring pad 59.

An improved form of sprocket pad 85 may be carried at the lower end of front plate 57 of the door 37 for suitably holding the film upon the lower intermittent sprocket (not shown) of the machine. By referring particularly to Figs. 6 and 8, it will be seen that the front plate 57 is provided with a depending lower portion 86 slightly curved to conform to the periphery of the intermittent sprocket. Portion 86 is provided with a threaded opening at 87 to receive an adjusting screw 88 and nut 89. A fixed pin 90 also projects outwardly for guiding a cross strap 91, between which and the adjusting nut 89 is confined a tension spring 92. Sprocket pad 85 is preferably divided into two units, each consisting of three plates 93, 94 and 95, the plates 93 and 95 being of substantially the same shape and size, but spaced by the plate 94, which is slightly smaller. These plates are carried upon upper and lower transverse bolts 96 and 97, which preferably lie behind the portion 86 of the front plate 57. The ends of the cross bar 91 engage against the plates 93, 94 and 95 of each unit, and apply a suitable tension thereto by means of this spring 92. By this construction, the pad is floatably carried and can readily adapt itself to or follow the edge of the intermittent sprocket, applying at the same time a uniform pressure the entire length of the pad's engagement with the intermittent sprocket.

These units, each comprising plates 93, 94 and 95, embrace the sides of depending portion 86 and due to the manner in which sprocket pad 85 is floatably carried, the edges 96' of the outside plates 93 and 95 engage against the periphery of the intermittent sprocket, while the teeth of the sprocket are allowed to ride freely therebetween, in non-contacting relation, because the center plate 94 terminates, between the outer plates, short of the edges 96'. It may be said that the sprocket pad 85 is self-seating or self-adjusting against the sprocket, and that the tension it applies thereagainst may be varied, by the operator, by means of the adjusting screw 88 and the knurled nut 89.

Having now described the film trap and the film trap door structures, as well as the other parts, which are carried in close association therewith, I shall now describe the film trap door locking and releasing mechanism, designated broadly as 100. It will be remembered that the novelty of this mechanism resides in its simplicity, consisting essentially of two parts, viz., a locking member and a member to be locked. It is quite important that a mechanism of this type should be reliable, while on the other hand, it should be well carried, so as to be easily reached and operated. It is always preferable to have it located for actuation within an easy reaching range of the operator's hands, while he is threading the film in the machine. To have it otherwise located, renders it difficult to actuate, and inconveniences the operator at a time when speed and accuracy by him are essential.

By referring more particularly to Figs. 11 to 14, inclusive, it will be noted that the film trap door 37 may be suitably secured in fixed relation by a pin 44' to a rod 44, before mentioned, and that said film trap door is movable thereby upon guide rods 35 and 36. Rod 44 may be carried by the film trap 5 in the manner shown in Fig. 11, that is, it may lie transversely with respect to the plane of the film trap in the side flange 6. In this figure, the door lies to the right of the film trap and the manner in which the bosses 40, 41 and 42 check the movement of this door by engaging against the film trap may be clearly seen therein. Rod 44 serves primarily to open the door 37, and to this end has a thumb piece 107 at the opposite end, being preferably threaded thereon, so that it may be used to vary the tension of the compression spring 108 confined between it and the flange 6. Spring 108 tends to move the door 37 to closed position, when rod 44 is released, and consequently, it is desirable to have said spring arranged in a manner permitting its tension to be varied; this assures that the tension is always sufficient to close the door quickly.

A rod 101 has been provided at right angles to rod 44 to hold rod 44 extended, against the tension of spring 108, with the door 37 in open position. Its further purpose will be, of course, to serve as a releasing member when the operator desires to close the door. This may be accomplished by carrying the rod 101, in slidable relation, in bearings 102 and 103 and having a portion thereof intercepting a portion of rod 44, with cooperating grooves 110 and 111 provided in these rods. Groove 111 may be furnished on rod 101 near its end in order to form, in effect, a head 112, which can engage in groove 110 when the door 52 is locked in open position.

A coil spring 104 surrounds rod 101 and is confined thereon between bearing 102 and a collar 105 pinned to rod 101, which collar will also serve as a stop for this rod when its head 112 drops into groove 110 to hold rod 44 locked in the open position of door 37. A thumb piece 116a is secured to the projecting end of rod 101. I find it desirable to allow the rod 101 to be freely rotatable, so as to distribute wear about its entire periphery.

The close proximity, in which the locking and releasing rod 101 lies, with respect to the side through which the film is threaded, can be clearly seen in Figs. 1, 4 and 6. The film will be threaded past the film gate opening 65 while door 37 is in its open position shown in Fig. 6. Those skilled in the art are acquainted with the procedure of threading the film. It is essential that upper and lower loops be formed in the film, and that this film be held in this position by the operator until he has closed the film trap door 37. The right hand is usually employed to hold the upper loop and the left hand to hold the lower loop, while the operator closes the door with whatever finger that is free. I find that the operation is greatly facilitated if this locking and release rod 101 is so located as to be in a position for actuation by the thumb of the right hand. It is for this reason that the location of the rod 101, between the heat shields 10 and the film trap 5, is of novelty in the present instance, but I wish it to be understood that there are other advantages obtained which are quite apparent to one skilled in this art. On the other hand, such disposition of rod 101 is not to be considered a limitation of the present disclosure, because it is possible to mount it in a different manner and in another position, without sacrificing these advantages.

Figure 9:
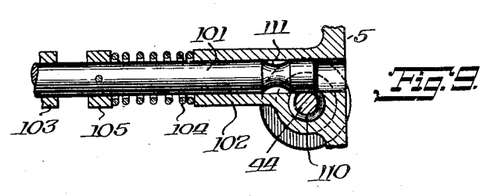
Fig. 9 is a sectional view taken on line 9—9 of Fig. 6.
Figures 11, 12:
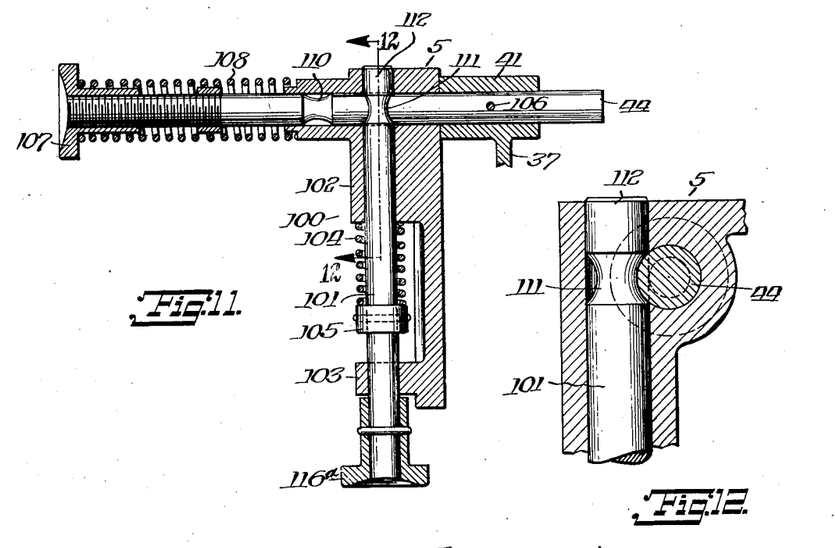
Figs. 11 to 14, inclusive, illustrate different parts of the film trap door holding and releasing mechanism in various positions.
Figures 13, 14:
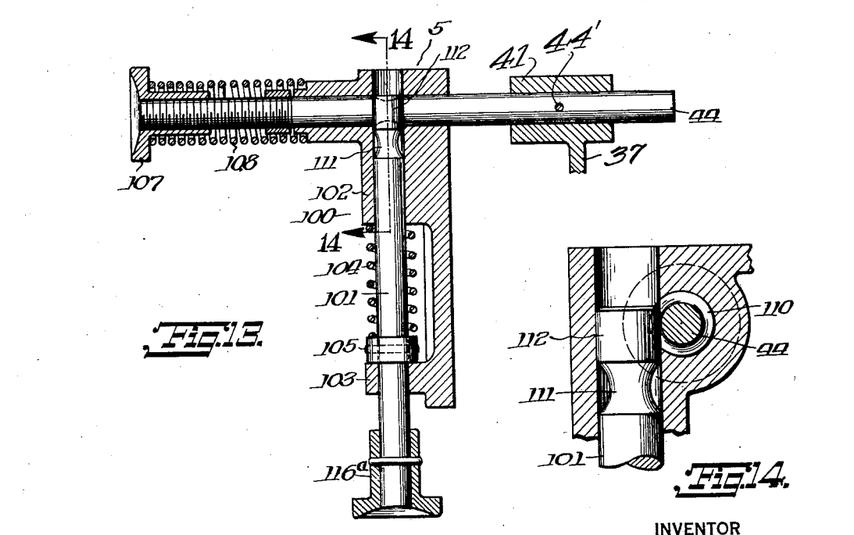

Fig. 11 represents the relative positions of rods 44 and 101 when the door 52 is in closed position; Fig. 12 is an enlarged view showing the rods intersecting each other in this position; Fig. 13 is a view similar to Fig. 11, but illustrating the door in open position; while Figs. 9 and 14 illustrate the rods in their intersecting relation, when the door is in open position.

The operation of this door locking and releasing mechanism is clearly apparent from these views. In Fig. 12 it will be observed that there is a tendency of rod 101, under the action of spring 104, to move its head 112 into engagement with groove 110 in rod 44, but this tendency is prevented by the groove 111, in which rod 44 lies, until this rod 44 is moved inwardly against the action of spring 108 a distance sufficient to bring groove 110 in alignment with rod 101. The head 112 then snaps into an engaging position with groove 110, due to the action of spring 104 carried on rod 101. Thus door 37 is locked in open position. Such a position of the rods is seen in Figs. 9 and 14, and this position is maintained until the transverse releasing rod 101 is pressed inwardly. This will slip the head 112 out of groove 110 to allow spring 108 to slidably move rod 44 forwardly, so as to quickly bring the film trap door to a close against the film trap 5.

Figure 2:
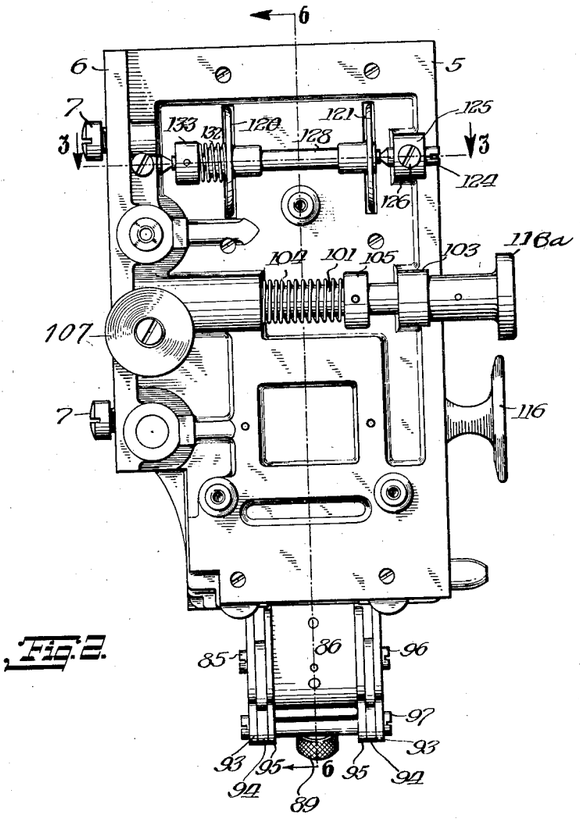
Fig. 2 is a similar view, but with the heat shields removed.
Figure 3:
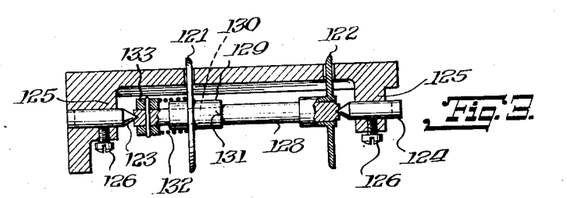
Fig. 3 is a detail sectional view taken on line 3—3 of Fig. 2.
Figure 5:
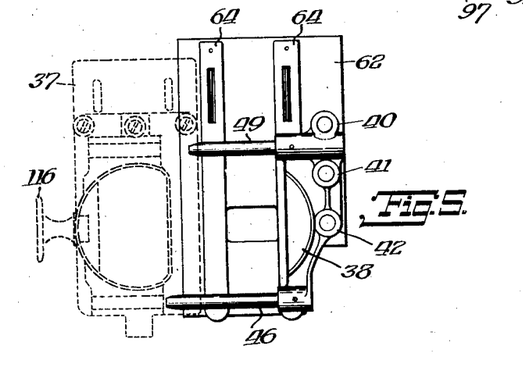
Fig. 5 is a showing at a reduced scale of the manner in which the film trap door is inserted upon or removed from its mounting.

My invention contemplates an improved form of lateral guide rollers 121 and 122 for the film when passing through the film trap. This construction can be best seen in Figs. 2, 3 and 5, wherein are shown pivot bearings 123 and 124, each being mounted in portions 125 formed on the film trap 5 and held therein by adjustable set screws 126.

Pivot bearings for this structure allow ready alignment of the rollers with the film, with practically little friction resulting from rotation because of the novel bearing points these pivot members 123 and 124 provide.

Guide rollers 121 and 122 are mounted on a shaft 128, carried by pivot bearings 123 and 124. The rollers are mounted in a manner permitting a slight lateral movement thereof relative to the film guided therebetween. It will be seen that this result will be accomplished by providing a laterally yieldable mounting for one of the rollers only, say roller 121, which mounting may comprise an integral bearing sleeve 129 formed on roller 121 for movement about a reduced portion 130 on shaft 128. One end of sleeve 129 is adapted to bear against a shoulder 131 on shaft 128 to keep the rollers spaced a certain distance apart, that is, to prevent closing in of the rollers so that they may never move a distance closer to each other than the normal width of the film.

A stop 133 may be pinned to the left hand end of shaft 128, and between this stop and roller 121 a spring 132 may be confined, which normally presses roller 121 against shoulder 131 to keep these rollers spaced their normal distance apart. It will be observed that a slight variation in this film permits the roller 121 immediately to follow the irregularity so as to keep these rollers at all times functioning efficiently in their office of guiding the film centrally past the film gate 65.

Roller 122 will, of course, rotate with shaft 128, but it preferably has no side movement.

Though I have described with great particularity of detail certain embodiments of my invention, it is not to be understood therefrom that the invention is restricted to the specific embodiments described. Various modifications in detail and in the arrangement of the parts may be made by those skilled in the art, without departing from the spirit and scope of the invention.

I claim:

1. In a device of the class described, the combination of a film trap and a bodily movably supported door carried thereby, including impelling means for closing said door and impact absorbing means oppositely disposed to said door serving to absorb the impact when said door is closed.

2. In a motion picture projector, the combination of a film trap, supporting elements carried by said film trap, a laterally extending film trap door holder supported by said elements, and a movable film trap door carried on said holder, a spring acting on said door whereby said door is substantially impelled to the closed position, said door comprising a mounting fixture and substantially flat plate forming the front thereof fastened to said mounting fixture, and resilient pressure elements oppositely disposed to said door carried by said plate for absorbing the impact when said door is closed.

3. In a motion picture projector, the combination of a film trap, forwardly extending supporting elements on said film trap, a film trap door, a holder for said door carried by said elements, lateral mounting means for said door whereby said door may be moved with respect to said holder as to be laterally insertable upon and removable from said holder.

4. A motion picture projector comprising a film trap including a film trap door and symmetrically disposed laterally extending supporting means therefor rigidly sustaining said door in movable relation substantially along its entire width.

5. A motion picture projector comprising a film trap including a movable film trap door and symmetrically disposed laterally extending supporting means therefor rigidly sustaining said door substantially along its entire width, said door being detachably supported upon said means.

6. A motion picture projector comprising a film trap including supporting means thereon for permitting ready insertion or withdrawal of a film trap door from said film trap, said supporting means being disposed symmetrically sustaining said film trap door laterally, substantially centrally and along its entire width, above and below the film gate aperture in said door.

7. Mechanism of the type described comprising a film trap and a film trap door movably supported thereon, including means for resiliently urging the same to the closed position, said door including a plurality of impact absorbing elements adapted to absorb the impact when said door is moved to closed position, said elements being disposed symmetrically and laterally associated with said door to provide a plurality of individual resilient contacting surfaces for the front of said door.

8. Mechanism of the type described comprising a film trap and a film trap door movably supported thereon, impelling means for moving the same to the closed position, a plurality of resilient contacting pads on said door for absorbing the impact when said door is moved to closed position, and symmetrically disposed means for mounting said resilient contacting pads so as to provide a substantially coextensive resilient engaging surface for said door.

9. Mechanism of the type described comprising a film trap and a film trap door movably supported thereon, and resilient means for moving the same, a plurality of resilient contacting pads on said door for absorbing the impact when said door is moved to closed position, and adjustable mounting means for certain of said resilient contacting pads permitting a predetermined adjustment of the tension of said resilient pads.

10. Mechanism of the type described comprising a film trap and a movably supported film trap door thereon, a resilient means urging said door to closed position, means for holding said film trap door in open position, means for releasing said film trap door from the action of said holding means whereby said door moves in response to action of said resilient means to closed position against said film trap, and impact absorbing elements in interposed relation between said film trap and said film trap door.

11. Mechanism of the type described comprising a film trap and a movably supported film trap door thereon, resilient means urging said door to closed position, means for holding said film trap door in open position against the pressure of resiliently urged means and, means for releasing said film trap door whereby said door moves to closed position against said film trap, in response to action of said resilient means, a film gate in said film trap and said door, means carried by the engaging faces of said film trap and door for guiding the film past said film gate, and impact absorbing means on the engaging face of said door, said impact absorbing means comprising resilient pressure elements adapted to absorb the impact when said door is moved to closed position.

12. Mechanism of the type described comprising a film trap including supporting means thereon for a film trap door, impelling means for said door adapted to close the same against said film trap, and means tending to absorb the impact when said door is closed, said means comprising a pad and a spring mounting for said pad.

13. Mechanism of the type described comprising a film trap including supporting means thereon for a film trap door, said door being arranged to close against said film trap, and means tending to absorb the impact when said door is closed, said means comprising a plate carried by said door and resilient mounting members for resiliently holding said plate extended from said door.

14. Mechanism of the type described comprising a film trap including supporting means thereon for a film trap door, a resilient pad on said door tending to absorb the impact when said door is closed, said resilient pad comprising a plate, studs at the corners of said plate extending through and to the opposite side of said door, cross bars connecting said studs, and spring means pressing against said cross bars whereby said plate may be held resiliently extended from said door.

15. A motion picture projector comprising a film trap including supporting means thereon for a film trap door, and a pressure element, disposed substantially centrally, for absorbing the impact when said door is closed, said element comprising an engaging surface on said door, and spring means for yieldably holding said surface extended from said door.

16. A motion picture projector comprising a film trap including supporting means thereon for a film trap door, and a substantially centrally located spring mounted pad tending to absorb the impact when said door is closed, said pad including means for varying the spring pressure uniformly throughout said pad.

17. A motion picture projector comprising a film trap including supporting means thereon for a film trap door, and a substantially centrally located spring mounted pad tending to absorb the impact when said door is closed, said pad including means for varying the spring pressure uniformly throughout said pad, said means comprising spring pressed bar members interconnecting through said door with the upper and lower corners of said pad.

18. A motion picture projector including a film trap door and resiliently impelled closing means therefor, said door being provided with means for absorbing the impact when said door is closed, said means comprising upper and central resiliently mounted pads, and a lower pad of a shock reducing material carried by said door.

19. A motion picture projector including a film trap door provided with means for absorbing the impact when said door is closed, said means comprising an apertured pad disposed substantially centrally on said door, and means for mounting said pad including corner studs loosely entering said door, cross bars on the opposite side of said door for connecting said corner studs, and spring means for yieldably bearing against cross bars.

20. A motion picture projector including a film trap door and impelling means for closing the same, said door being provided with means for absorbing the impact when said door is closed, said means comprising an apertured pad disposed substantially centrally on said door, and means for mounting said pad, said means interconnecting with the corners of said pad.

21. A motion picture projector including a film trap door and impelling means for closing the same, said door being provided with means for absorbing the impact when said door is closed, said means comprising an apertured pad disposed substantially centrally on said door, and means for mounting said pad, said means interconnecting with the corners of said pad and serving to resiliently carry said pad.

22. A motion picture projector including a film trap door provided with means tending to absorb the impact when said door is closed, said means comprising a centrally disposed pad, and a resilient mounting for said pad, said resilient mounting consisting of corner studs extending into said door and connecting to cross bars on the opposite side of said door, a plurality of spring elements on said opposite side of said door, and means for varying the tension of said spring elements.

23. A motion picture projector including a film trap door provided with means tending to absorb the impact when said door is closed, said means comprising a pad, and a resilient mounting for said pad, said resilient mounting consisting of corner studs extending into said door, upper and lower cross bars on the opposite side of said door interconnecting respectively with the upper and lower corner studs, and a spring pressing against each bar to hold said pad resiliently mounted.

24. A motion picture projector including a film trap door provided with means tending to absorb the impact when said door is closed, said means comprising a pad, and a resilient mounting for said pad, said resilient mounting consisting of corner studs extending into said door, upper and lower cross bars on the opposite side of said door interconnecting respectively with the upper and lower corner studs, a spring pressing against each bar to hold said pad resiliently mounted, a threaded bolt for carrying each spring, and an adjustable nut on each bolt for varying the tension of said springs.

25. A motion picture projector including a film trap and a film trap door adapted to be impelled to close the same and provided with means tending to absorb the impact when said door is closed against said film trap, said means comprising upper and central pads, a resilient mounting for each pad, the resilient mounting for said upper pad being provided with means for imparting resiliency to the pad substantially at a central point with respect to the pad, the resilient mounting for said central pad being provided with means for imparting resiliency to the pad substantially at the upper and lower ends of the pad, whereby both of said pads yieldably engage substantially at all points thereon with said film trap.

26. A motion picture projector including a film trap provided with supporting elements for removably carrying a film trap door, said door comprising a main casting and a front plate therefor, said plate being provided with a film gate aperture therein, bearing portions on said main casting for receiving said supporting elements, said main casting being furnished with a lens holder aperture located between said bearings, an impact absorbing pad on said front plate, and spring means for said impact absorbing pad extending into said lens holder aperture and having means thereon for varying the tension exerted against said pad.

27. A motion picture projector including a film trap provided with means for movably carrying a film trap door thereon including impelling means for urging the door closed, means for locking said door in open position, means for releasing said door whereby said door is moved to closed position, heat shields on said film trap, and means on said film trap for supporting said heat shields in spaced relation thereto, said releasing means being transversely located in said spacing between said film trap and said heat shields.

28. A motion picture projector including a film trap provided with means for movably carrying a film trap door thereon, means for releasing said door, heat shields on said film trap, and a plurality of integral projections on said film trap for carrying said heat shields in spaced relation thereto, said releasing means extending therefrom at one side and lying in said spacing between said film trap and said heat shields.

29. A motion picture projector including a film trap provided with means for movably carrying a film trap door thereon, a plurality of heat shields, outwardly extending projections on said film trap for said heat shields whereby the latter may be supported a substantial distance from the film gate aperture in said film trap, said heat shields being provided with corresponding film gate apertures and with two of these shields arranged with a movably mounted fire shutter operating therebetween, and a third shield spaced at a relatively greater distance than said first two shields.

30. A motion picture projector including a film trap provided with means for movably carrying a film trap door thereon, a film gate in said film trap, heat shields disposed in front of said film gate, said shields being supported on a forwardly extended mounting whereby the heat barrier provided thereby will extend a maximum distance from said film gate, said mounting comprising projections on said film trap adapted to receive a plurality of fastening elements which pass through said shields and into said projections, two of said shields being arranged in spaced relation whereby a movably mounted fire shutter may operate therebetween, and stops provided on these said two shields for limiting the movement of said fire shutter.

31. A motion picture projector including a film trap provided with means for movably carrying a film trap door thereon, a film gate in said film trap, heat shields disposed in front of said film gate, said shields being supported on a forwardly extended mounting whereby the heat barrier provided thereby will extend a maximum distance from said film gate, said mounting comprising projections on said film trap adapted to receive a plurality of fastening elements which pass through said shields and into said projections, two of said shields being arranged in spaced relation whereby a movably mounted fire shutter may operate therebetween, stops provided on these said two shields for limiting the movement of said fire shutter, and means on said projections for spacing the third shield from the first two shields.

32. A motion picture projector comprising a film trap provided with means for movably carrying a film trap door therein, and means for maintaining the door normally closed, said door being adapted to have an open position and a closed position, means for moving said door to open position against the action of said second means, and means for locking said first means against movement whereby said door may be held in open position, said last means arranged to release said door by releasing said first means.

33. Mechanism for locking and releasing a film trap door movably carried by a film trap of a motion picture projector comprising a locking rod and a rod to be locked, means for movably supporting said rods in interengaging relation whereby the rod to be locked may be restrained against movement by the locking rod to hold said door in opened position.

34. Mechanism associated with the film trap of a motion picture projector and adapted to lock a film trap door in opened position and to release said door whereby said door is moved to closed position, said mechanism comprising a pair of rods arranged in intersecting relation, one rod including a portion serving as a locking and releasing element and the other rod as the element to be locked.

35. Mechanism associated with the film trap of a motion picture projector and adapted to lock a film trap door in opened position and to release said door whereby said door is moved to closed position, said mechanism comprising a pair of spring pressed rods including intersecting and engaging portions for each other.

36. Mechanism associated with the film trap of a motion picture projector and adapted to lock a film trap door in opened position and to release said door whereby said door is moved to closed position, said mechanism comprising a pair of axially movable members arranged in intersecting relation each of which include means to interengage each other.

37. Mechanism associated with the film trap of a motion picture projector and adapted to lock a film trap door in opened position and to release said door whereby said door is moved to closed position, said mechanism comprising a rod on which said door is adapted to be carried in movable relation, a spring tending to hold said door in closed position relatively to said trap, and a locking rod including means to interlock with said first rod at predetermined points along its length for preventing said spring from closing said door.

38. Mechanism associated with the film trap of a motion picture projector and adapted to lock a film trap door in opened position and to release said door whereby said door is moved to closed position, said mechanism comprising a rod for moving said door to open position, spring means tending to return said door to closed position, a locking rod including means to interlock with said first rod for preventing said spring from closing said door, and additional spring means tending to release said locking rod from interlocking relation with said first rod.

39. Mechanism associated with a film trap of a motion picture projector comprising means for locking a film trap door in open position, said mechanism provided with means for releasing said door, said releasing means being transversely slidably mounted to intersect said locking mechanism whereby to hold said door in open position.

40. In a motion picture projector, the combination of a film trap and a movably carried film trap door, mounting means for said door, a rod for moving said door to open position on said mounting means, a second rod arranged to lie in an intersecting relation with respect to the first rod and to interlock therewith, spring means tending to move said rods into engagement with each other, said rods being each provided with a groove into which the opposite rod is adapted to move, said second rod being adapted for engagement with the groove of the first rod whereby to hold said door in open position.

41. In a motion picture projector, the combination of a film trap, a film trap door, an intermittent sprocket pad carried at the lower end of said film trap door, said pad serving yieldably to hold the film in driving relation with the intermittent sprocket, means on said door for mounting said pad comprising a plurality of plates arranged as units at the sides of said film trap door, bolts interconnecting said units whereby to move the units in unison with each other, and spring means projecting from said plates for yieldably pressing against said units.

In testimony whereof I have hereunto signed my name.

AUGUSTO DINA.